June 10, 1924.
J. E. REDFORD
LOAD BRAKE DEVICE
Filed Aug. 6, 1923
1,496,945
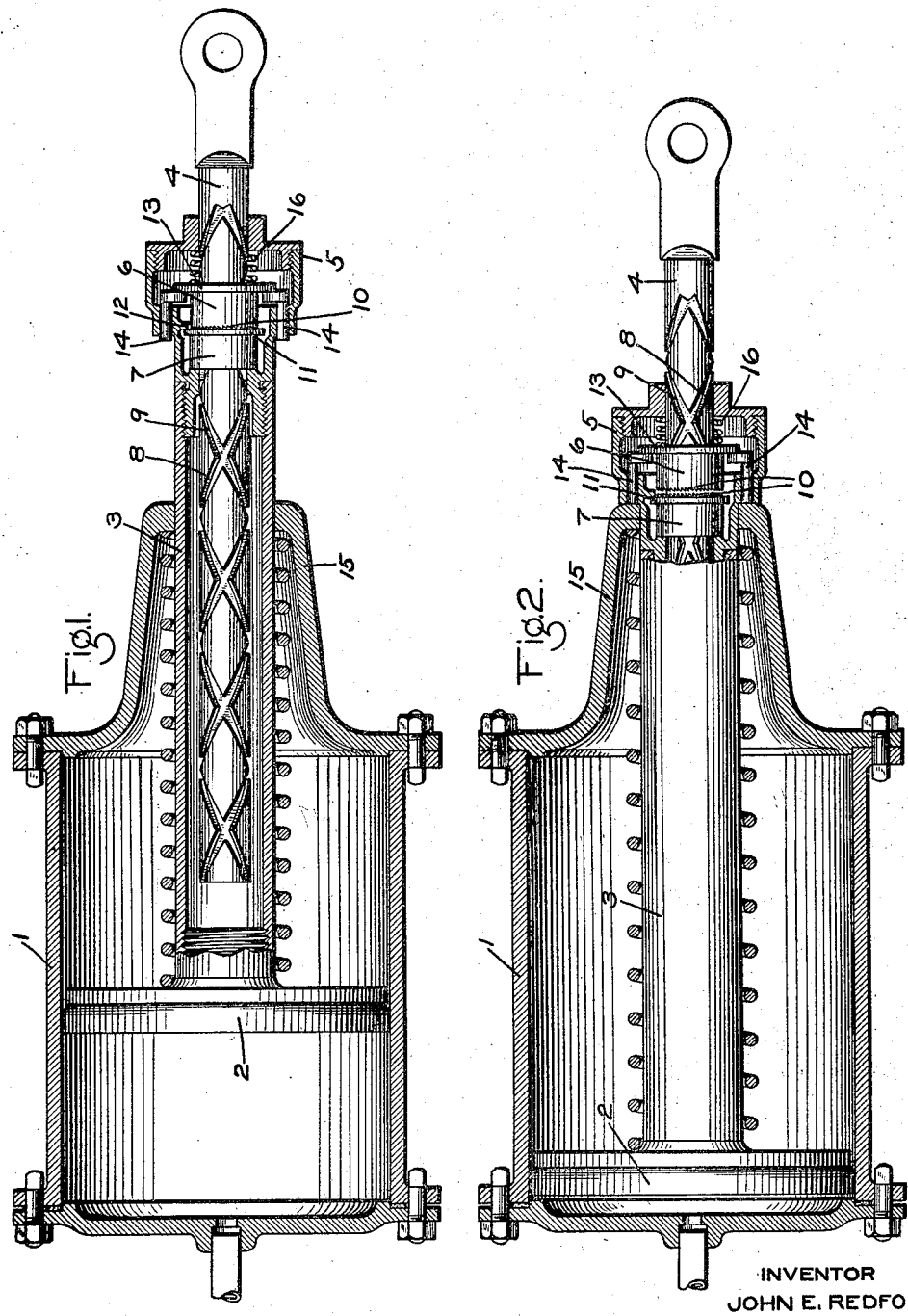
INVENTOR
JOHN E. REDFORD
BY *Wm. M. Cady*
ATTORNEY Patented June 10, 1924.

1,496,945

UNITED STATES PATENT OFFICE.

JOHN E. REDFORD, OF KINLOCH PARK, MISSOURI, ASSIGNOR TO THE WESTINGHOUSE AIR BRAKE COMPANY, OF WILMERDING, PENNSYLVANIA, A CORPORATION OF PENNSYLVANIA.

LOAD-BRAKE DEVICE.

Application filed August 6, 1923. Serial No. 655,798.

*To all whom it may concern:*

Be it known that I, JOHN E. REDFORD, a citizen of the United States, residing at Kinloch Park, in the county of St. Louis and State of Missouri, have invented new and useful Improvements in Load-Brake Devices, of which the following is a specification.

This invention relates to a clutch mechanism adapted more particularly to be employed in connection with the brake cylinder of a fluid pressure brake.

It has heretofore been proposed to provide a fluid pressure brake system in which the braking power on an empty or light car is provided by one brake cylinder of relatively small piston area while on a loaded car, fluid is first supplied to the small primary brake cylinder to apply the brakes with a light pressure and then fluid is supplied to an additional larger brake cylinder.

With a construction of the above character, the piston rod of the large brake cylinder being connected to the brake rigging, must be free to move relatively to the large brake cylinder piston when the smaller brake cylinder only is operating to supply braking power on an empty car and also during the preliminary movement of the smaller brake cylinder piston, when operating on a loaded car, before the larger brake cylinder is cut into action.

For this reason, a clutch mechanism is required for automatically connecting the piston rod of the larger brake cylinder to the larger brake cylinder piston, when said piston is operated to provide increased braking power on a loaded car.

The principal object of my invention is to provide an improved clutch mechanism for the above mentioned purpose.

In the accompanying drawing; Fig. 1 is a sectional view of a fluid pressure brake cylinder, showing my invention applied thereto, and with the brake cylinder piston in a brake applied position; and Fig. 2 a view similar to Fig. 1, but showing the brake cylinder piston in release position.

Within brake cylinder 1 is a brake cylinder piston 2 having secured thereto a hollow sleeve 3 and mounted within the sleeve 3 is a piston push rod 4 which is operatively connected in the usual manner to the usual brake rigging. Secured to the outer end of the sleeve 3, which extends outside of the brake cylinder 1, is a housing 5 and mounted within the housing are nuts 6 and 7 adapted to respectively engage one or more right and left hand spiral grooves 8 and 9, which are cut in the piston rod 4. The pitch or angle of the grooves 8 and 9 is such that either nut will rotate freely but in opposite directions, when force is longitudinally applied to the piston rod 4.

The meeting faces of the nuts 6 and 7 are provided with teeth 10, which, when engaged prevent rotation of the nuts. Forward movement of the nut 7 is limited by engagement of a flange 11 with a retaining finger 12 and the nut 6 is provided with a flange 13 adapted to engage release pins 14.

The release pins 14 project outside of the housing 5 and are adapted to engage the outer end of the non-pressure head 15 of the brake cylinder 1.

In operation, when the brake cylinder piston 2 is in release position, as shown in Fig. 2, the release pins 14 engage the end of the non-pressure head 15 and hold the nut 6 so that the teeth 10 of the nuts 6 and 7 are out of engagement. The piston rod 4 is now free to move longitudinally, without moving the piston 2, when force is applied to the brake rigging to which the brake piston 4 is attached, as by the operation of another brake cylinder, since the nuts 6 and 7 are free to rotate in opposite directions on the rod 4.

When fluid under pressure is supplied to brake cylinder piston 2, in order to provide braking power on a loaded car, the outward movement of piston 2 will allow movement of the release pins 14, so that the spring 16 will move the nut 6 to cause the teeth 10 of nuts 6 and 7 to engage. The engagement of the teeth 10 locks the nuts 6 and 7 against rotation, so that the nuts operate as a clutch mechanism to lock the piston rod 4 to the sleeve 3 and consequently the piston rod 4 moves out with the sleeve 3 and the brake cylinder piston 2, as shown in Fig. 1.

When the brakes are released, the rearward movement of the brake cylinder piston 2 causes the release pins 14 to engage the head 15 and thus move the nut 6, so that the teeth 10 are thrown out of engagement to permit subsequent relative movement of the piston rod 4.

With the above described clutch mechanism, the transmitted loads are centralized and balanced, thus relieving the parts of excessive strains and the construction is such that a slight movement of the brake cylinder piston will effect the locking and unlocking of the clutch mechanism.

It will also be noted that the clutch mechanism being centralized around the piston rod, a very compact arrangement is provided.

Having now described my invention, what I claim as new and desire to secure by Letters Patent, is:—

1. The combination with a brake cylinder and a piston therein, of a piston rod having spiral grooves, a nut engaging each groove, locking means for preventing rotation of said nuts, and means operated upon movement of said piston to release position for releasing said locking means.

2. The combination with a brake cylinder and a piston therein, of a piston rod having spiral grooves and a clutch mechanism for operatively connecting said rod to said piston comprising a nut for engaging each groove, means for locking said nuts against rotation, and means for holding said locking means released in the release position of said piston.

3. The combination with a brake cylinder and a piston therein, of a piston rod having a right and a left hand spiral groove, a nut for engaging each groove, interlocking teeth at the meeting faces of said nuts, and a release member operated upon movement of said piston to release position for effecting the disengagement of said teeth.

4. The combination with a brake cylinder and a piston therein, of a piston rod having a right and a left hand spiral groove, a nut for engaging each groove, interlocking teeth at the meeting faces of said nuts, yielding means tending to maintain said teeth in engagement, and a release pin operable upon movement of said piston to release position, for moving one of said nuts so that said teeth are disengaged.

5. The combination with a brake cylinder and a piston therein, of a piston rod having a right and a left hand spiral groove, a nut for engaging each groove, interlocking teeth at the meeting faces of said nuts, yielding means tending to maintain said teeth in engagement, a stop, and releasing means engaging one of said nuts, and adapted to engage said stop upon movement of said piston to release position.

In testimony whereof I have hereunto set my hand.

JOHN E. REDFORD.